US008205853B2

(12) United States Patent
Bleier et al.

(10) Patent No.: US 8,205,853 B2
(45) Date of Patent: Jun. 26, 2012

(54) FLEXURE MOUNT FOR AN OPTICAL ASSEMBLY

(75) Inventors: Zvi Bleier, Lloyd Harbor, NY (US); Alexander Jacobson, Deer Park, NY (US)

(73) Assignee: FTRX LLC, Deer Park, NY (US)

( * ) Notice: Subject to any disclaimer, the term of this patent is extended or adjusted under 35 U.S.C. 154(b) by 0 days.

(21) Appl. No.: 13/324,459

(22) Filed: Dec. 13, 2011

(65) Prior Publication Data

US 2012/0091310 A1 Apr. 19, 2012

Related U.S. Application Data

(62) Division of application No. 12/505,279, filed on Jul. 17, 2009.

(60) Provisional application No. 61/081,547, filed on Jul. 17, 2008.

(51) Int. Cl.
*F16M 13/00* (2006.01)

(52) U.S. Cl. .................. 248/569; 248/346.01; 248/570; 248/576

(58) Field of Classification Search .................. 248/569, 248/560, 346.01, 570, 576, 614, 618
See application file for complete search history.

(56) References Cited

U.S. PATENT DOCUMENTS

| | | | |
|---|---|---|---|
| 3,663,084 | A | 5/1972 | Lipkins |
| 4,383,762 | A | 5/1983 | Burkert |
| 4,556,316 | A | 12/1985 | Doyle |
| 4,635,887 | A | 1/1987 | Hall et al. |
| 4,710,001 | A | 12/1987 | Lacey |
| 4,915,502 | A | 4/1990 | Brierley |
| 4,991,961 | A | 2/1991 | Strait |
| 5,196,902 | A | 3/1993 | Solomon |
| 5,335,111 | A | 8/1994 | Bleier |
| 5,349,438 | A | 9/1994 | Solomon |
| 5,486,917 | A | 1/1996 | Carangelo et al. |
| 5,949,544 | A | 9/1999 | Manning |
| 6,141,101 | A | 10/2000 | Bleier et al. |
| 6,246,052 | B1 | 6/2001 | Cleveland et al. |
| 6,453,566 | B1 | 9/2002 | Bottinelli et al. |
| 6,836,968 | B1 | 1/2005 | Walker et al. |
| 7,275,332 | B2 | 10/2007 | Blanding |
| 7,835,077 | B2 | 11/2010 | Rosenqvist |

OTHER PUBLICATIONS

Smith, S.T., Ultraprecision Mechanism Design, Chap. 4, Flexure Design for Positioning and Control, pp. 95-112.

Vehar, Christine, "Flexure Design for Precision and Control", http://www.engin.umich.edu/labs/csdl/ppslides/FlexureDesignForPrecisionAndControl_files/v3_document.html (Mar. 18, 2004).

Ex parte Quayle Communication of U.S. Appl. No. 12/505,279, dated Nov. 14, 2011.

Restriction Requirement Communications of U.S. Appl. No. 12/505,279, dated Jun. 16, 2011.

*Primary Examiner* — Amy J. Sterling
(74) *Attorney, Agent, or Firm* — Gilman Pergament LLP

(57) ABSTRACT

A flexure mount for economically producing pure translational motion with no arcuate or error motion in the vertical direction utilizing alignment pins and parts reducing structures including monolithic springs. A low profile embodiment utilizes a compound monolithic spring. The flexure mount may be used to translate a mirror or retroreflector in a purely linear direction of precisely controlled and known distance, useful in myriad interferometer applications including spectroscopy.

4 Claims, 13 Drawing Sheets

FLEXURE MOUNT FOR AN OPTICAL ASSEMBLY

CROSS-REFERENCE TO RELATED APPLICATION

This application is a Divisional application of U.S. patent application Ser. No. 12/505,279, filed Jul. 17, 2009, which is presently pending and claims priority to, and the benefit of, provisional U.S. application Ser. No. 61/081,547, filed on Jul. 17, 2008, the entireties of which applications are incorporated herein by reference in their entireties.

FIELD OF THE INVENTION

The present invention is in the field of mechanisms for economically producing pure translational motion with no arcuate or error motion in the vertical direction. Such pure translational motion is critical for precision instrumentation applications. One such application is the movement of optical assemblies such as retroreflectors in interferometer/spectroscopy applications.

BACKGROUND OF THE INVENTION

Fourier transform infrared ("FTIR") spectrometers are well known in the art. Michelson interferometers function by splitting a beam of electromagnetic radiation into two separate beams via a beam splitter. Each beam travels along its own path, e.g. a reference path of fixed length and a measurement path of variable length. A reflecting element, such as a retroreflector, is placed in the path of each beam and returns them both to the beam splitter. The beams are there recombined into a single exit beam. The variable path length causes the combined exit beam to be amplitude modulated due to interference between the fixed and variable length beams. By analyzing the exit beam, the spectrum or intensity of the input radiation can, after suitable calibration, be derived as a function of frequency.

When the above interferometer is employed in a FTIR spectrometer, the exit beam is focused upon a detector. If a sample is placed such that the modulated beam passes through it prior to impinging upon the detector, the analysis performed can determine the absorption spectrum of the sample. The sample may also be placed otherwise in the arrangement to obtain other characteristics.

Where the path length through the interferometer is varied by moving a retroreflecting element along the axis of the beam, the maximum resolution attainable with the instrument is proportional to the maximum path difference that can be produced. Because Michelson interferometers rely upon the interference from recombination of the two beams, a quality factor of such a device is the degree to which the optical elements remain aligned during path-length variation. Thus, translational displacement of the mirror must be extremely accurate. That is, the mirror must in most cases remain aligned to within a small fraction of the wavelength of incident light, over several centimeters of translation. Any deviation from pure translation may cause slight tilting of a plane mirror, leading to distortion in the detected beam. Substitution of cube-corner and cats-eye retroreflectors for plane mirrors can essentially eliminate such tilting distortion problems; but with certain inherent drawbacks.

Precision bearings may be used to maintain alignment. In addition, monitoring and controlling alignment with analysis of feedback and subsequent repositioning has been utilized to maintain mirror alignment. Systems relying on either such solution are difficult to design, relatively large, expensive and present maintenance issues.

Other efforts have been made to develop interferometers that do not require precision bearings or control systems. Tiltable assemblies consisting of a pair of parallel, confronting mirrors have been suggested as replacements to the longitudinally displaced retroreflector. U.S. Pat. No. 4,915,502, issued on Apr. 10, 1990, teaches a twin-arm interferometer spectrometer having a tiltable assembly by which the optical path lengths of the two beams are varied simultaneously. A much smaller rotation, relative to retroreflectors, of the paired mirrors results in the path difference. This design reduces sensitivity to linear movement of the optical element; moreover, rotating bearings are generally easier and less expensive to produce than are longitudinal or linear ones.

U.S. Pat. No. 4,383,762, issued on May 17, 1983 and provides a two-beam interferometer for FTIR spectroscopy in which a pendulum arm holds moving cube corner retroreflectors. The movement, i.e. arcuate oscillation, results in accurate changes in path-length produced in a smooth motion. The retroreflectors render the system unaffected by the tilt and avoids the disadvantages for FTIR spectroscopy that are inherent in the deviation from strict linearity from the pendulous motion.

So-called "porch swing" mounting arrangements are also known in the art. Here, structural elements are supported at four pivot points and form a parallelogram by which a mirror undergoes pure translation along an axis. The extremely high machining tolerances required of such an arrangement and related issue of assembling same, result in high costs of both manufacture and maintenance. In addition, such pure translation flexure mounts are not typically useful for the relatively large displacements necessary for high resolution applications. The need for greater displacement can be achieved, but primarily through great cost of highly engineered precision instrumentation.

Over and above the issues raised above, the mirror-supporting structure must be isolated to the greatest possible degree from extraneous forces which would tend to produce distortions of the structure. Such forces and resultant distortions introduce inaccuracies into the optical measurements. The forces may arise from vibrational effects from the environment and can be rotational or translational in nature. A similarly pervasive issue concerns thermal and mechanical forces. Needless to say, considerations of weight, size, facility of use, efficiency, manufacturing cost and feasibility are also of primary importance.

Accordingly, it would be desirable to provide an optical assembly comprising a flexure mount with pure translation over a sufficiently large displacement at a reasonable cost of manufacture and maintenance. It is also desirable that the optical assembly be isolated from extraneous forces tending to produce optical distortions.

SUMMARY OF THE INVENTION

Accordingly, it is a broad object of the invention to provide a precision instrument flexure mount comprising a base, an actuator having a fixed relationship to the base and a frame mounted on the base. The flexure mount has two base monolithic springs and two carriage monolithic springs, each spring having a cross piece and two vertical pieces with bottom ends. A plurality of transverse members is also provided. Each transverse member is fastened to a top frame portion with at least a portion of one spring cross piece held therebetween. The bottom end of each vertical piece of the carriage springs is fastened between a connection member and a carriage member while the bottom end of each vertical piece of the base springs is fastened between a connection member and the base. A translation arm is attached adjacent a first end to the actuator and adjacent a second end to a precision instrument element. A central portion of the translation arm extends through the frame, the central portion attached to the carriage member. The actuator imparts a force on the arm, and the frame functions such that translation of the arm through the frame is constrained to one orthogonal axis.

Stiffening members may be disposed over a central portion of the spring vertical pieces, dividing the spring vertical pieces into two spring elements.

In a preferred embodiment of the present invention, an alignment system is provided. The alignment system includes a plurality of pin holes in one or more monolithic springs. A plurality of pin receptacles is provided in each one of either the transverse member or top frame portion; each one of either the carriage connection member or the carriage member; and each one of either the base connection member or the base. Finally, a plurality of alignment pins is provided on the other of either the transverse member or top frame portion; the other of either the carriage connection member or the carriage member; and the other of either the base connection member or the base. Each alignment pin is in registration with one pin hole and one pin receptacle, enabling precision assembly of the frame.

The assembly alignment system may also be applied to the stiffening member structure with a plurality of alignment pins in the one of either the first stiffening member or second stiffening member, and a plurality of pin receptacles in the other stiffening member. Each alignment pin in registration with one pin hole and one pin receptacle, enabling precision assembly of the stiffening members.

Another object of the invention is to provide a novel precision instrument flexure mount having a low profile. The low-profile frame having a base, an actuator having a fixed relationship to the base and a frame mounted on the base. The frame comprising two compound monolithic springs, each spring having a cross piece, two vertical pieces with bottom ends and a spring central piece with a bottom end. The frame further has a plurality of transverse members, each transverse member is fastened to a top frame portion with at least a portion of one spring cross piece held therebetween. The bottom end of the spring central piece is fastened between a carriage connection member and a carriage member while the bottom end of each vertical piece is fastened between a base connection member and the base. A translation arm is attached adjacent a first end to the actuator and adjacent a second end to a precision instrument element, a central portion of the translation arm extends through the frame and is attached to the carriage member, the actuator imparting a force on the arm, whereby translation of the arm through the frame is constrained to one orthogonal axis. The spring central piece may have a window through which the translation arm extends.

The stiffening members and alignment systems described previously may also be associated with the compound monolithic spring, including the central spring portion thereof.

DETAILED DESCRIPTION OF THE INVENTION

Figure 1:
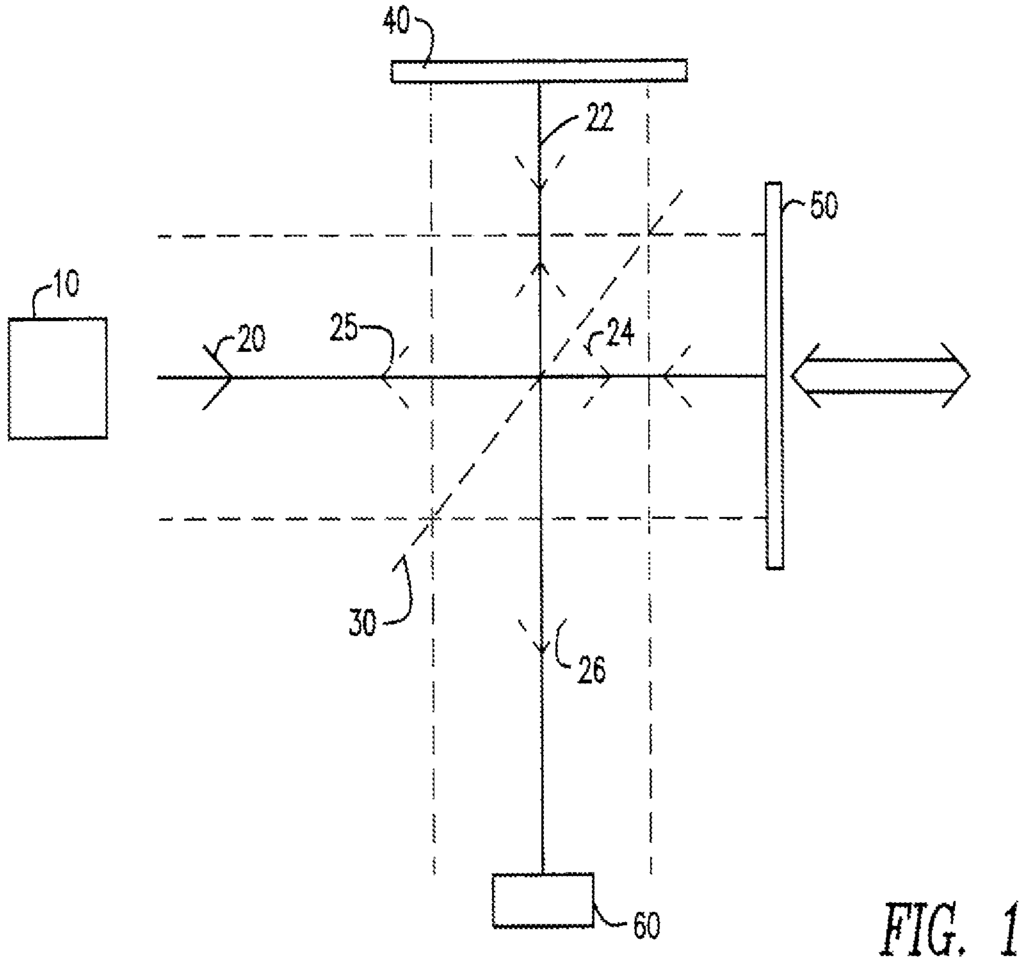
FIG. 1 (PRIOR ART)
FIG. 1 is a diagram showing how radiation is reflected in a prior art Michelson interferometer.

Referring to FIG. 1, the general principals of a standard Michelson interferometer are shown. The Michelson interferometer has a radiation source 10 which sends a single radiation beam 20 towards beamsplitter 30 which is situated at an angle to two mirrors, a fixed mirror 40 and a movable mirror 50. Radiation beam 20 is partially reflected toward fixed mirror 40 in the form of radiation beam 22, and is partially translated through beamsplitter 30 towards movable mirror 50 as radiation beam 24. Beam 22 is then reflected off of fixed mirror 40, back towards beamsplitter 30, where it is once again partially split, sending some radiation 25 back towards source 10, and some radiation 26 toward detector 60. Similarly, beam 24 reflects off of movable mirror 50 and is reflected back toward beamsplitter 30. Here also, beam 24 is again split, sending some radiation back to source 10 and other radiation 26 toward detector 60.

Detector 60 measures the interference between the two radiation beams emanating from the single radiation source. These beams have, by design, traveled different distances (optical path lengths), which creates the fringe effect which is visible and measurable to detector 60.

Figure 2:
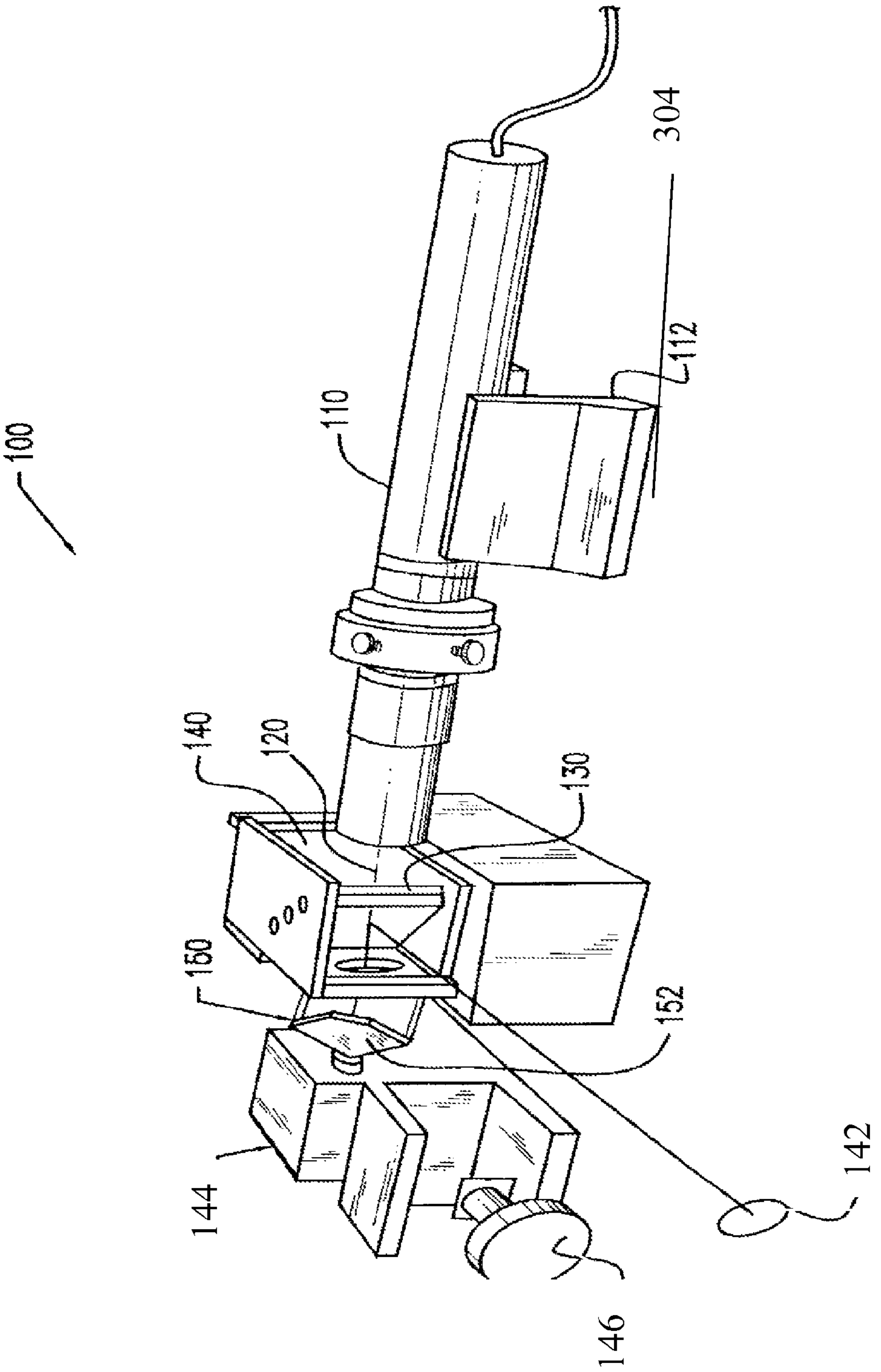
FIG. 2 (PRIOR ART)
FIG. 2 is a perspective view of an interferometer having a monolithic optical assembly.

FIG. 2 shows the lay out and component structure of a Michelson interferometer of the prior art, e.g. U.S. Pat. No. 6,141,101 to Bleier, herein incorporated by reference. FIG. 2 shows interferometer 100, and includes a radiation source 110, a beamsplitter 130, a movable reflecting assembly 150, a fixed reflecting assembly 140 and a detector 142. Radiation source 110 is mounted in a secure position by mounting assembly 112. With radiation source 110 in mounting assembly 112, radiation beam 120 is alignable along a path which will fix the direction of the beam at the appropriate angle to beamsplitter 130.

Radiation source 110 can be collimated white light for general interferometry applications, such as distance measurement calculation, or even a single collimated radiation intensity laser light source.

Movable reflecting assembly 150 utilizes a hollow corner-cube retroreflector 152. The hollow corner-cube retroreflector 152 could be made in accordance with the disclosure of U.S. Pat. No. 3,663,084 to Lipkins, herein incorporated by reference.

Retroreflector 152 is mounted to a movable base assembly 144, which assembly allows for adjustment of the location of retroreflector 152 in a line along the path of beam 120. The displacement of assembly 144 is adjustable through use of adjusting knob 146, but other means of moving assembly 144 are also anticipated by the invention, including such means that might allow for continuous, uniform movement of assembly 144. It is also possible that the manor of mounting retroreflector 152 to assembly 144 might be made in accordance with the structure described in U.S. Pat. No. 5,335,111 to Bleier, herein incorporated by reference.

The use of retroreflector 152 as movable reflecting assembly 150 allows for any orientation of retroreflector 152, as long as the reflecting surfaces of the retroreflector are maintained at the appropriate angle to the direction of incoming beam 120 after it passes through beamsplitter 130 and also as long as edge portions of the retroreflector mirrors do not clip a portion of beam 120.

From the foregoing, the length of the light path 22 is fixed and known while the length of light path 24 may be varied. The variation of the length of light path 24 is, of course, critical to the operation of the interferometer, as is knowing the length as precisely as possible.

Figure 3:
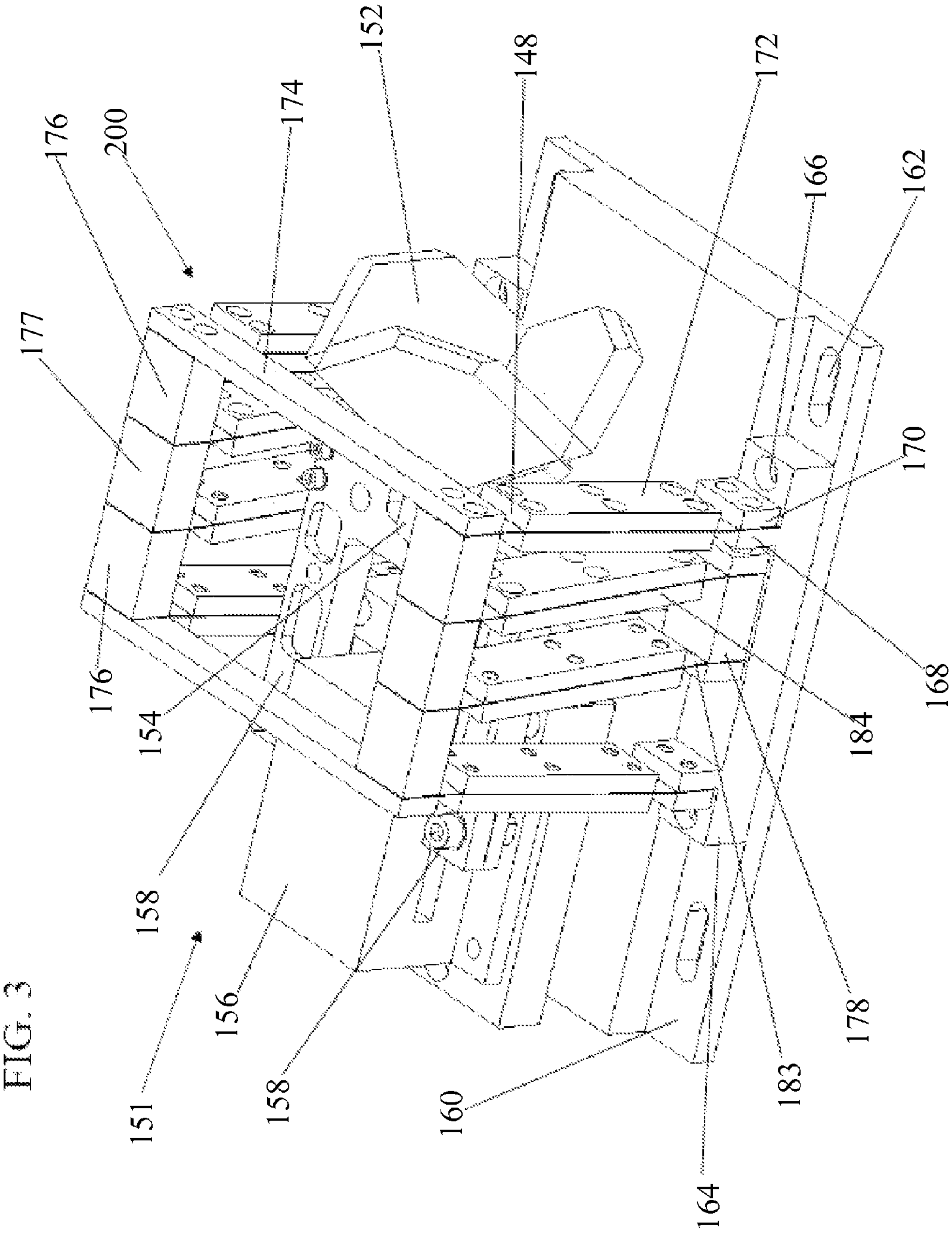
FIG. 3 is a perspective view of flexure mount for producing pure translational motion.

FIG. 3 illustrates a variable path length assembly 151 for displacing retroreflector 152 a precisely known distance in as perfectly linear a direction as possible, i.e. along a single straight-line axis. Retroreflector 152 is attached to a translation voice coil actuator 156 through translation arm 154 and translation bracket 158. Voice coil actuator 156 contains standard means for causing translation bracket 158, and thus translation arm 156 and retroreflector 152, to move a precisely controlled and known distance. Translation arm 156 is also supported by bridge 180. Bridge 180 is attached at its bottom end to carriage member 178, further described below. Alternatively, carriage member 178 may be formed integrally with bridge 180.

Base 160 of variable path length assembly 151 supports frame 200 and translation voice coil actuator 156. Attachment holes 162 are used to attach variable path length assembly 151 to other components of the device of which the assembly 151 is a component. Bottom frame member 164 may be formed integrally with base 160 or be attached thereto utilizing holes 166. Bottom frame member 164 is provided with frame connection flange 168 to which the remainder of the frame 200 is attached by way of connection member 170.

Figure 6:
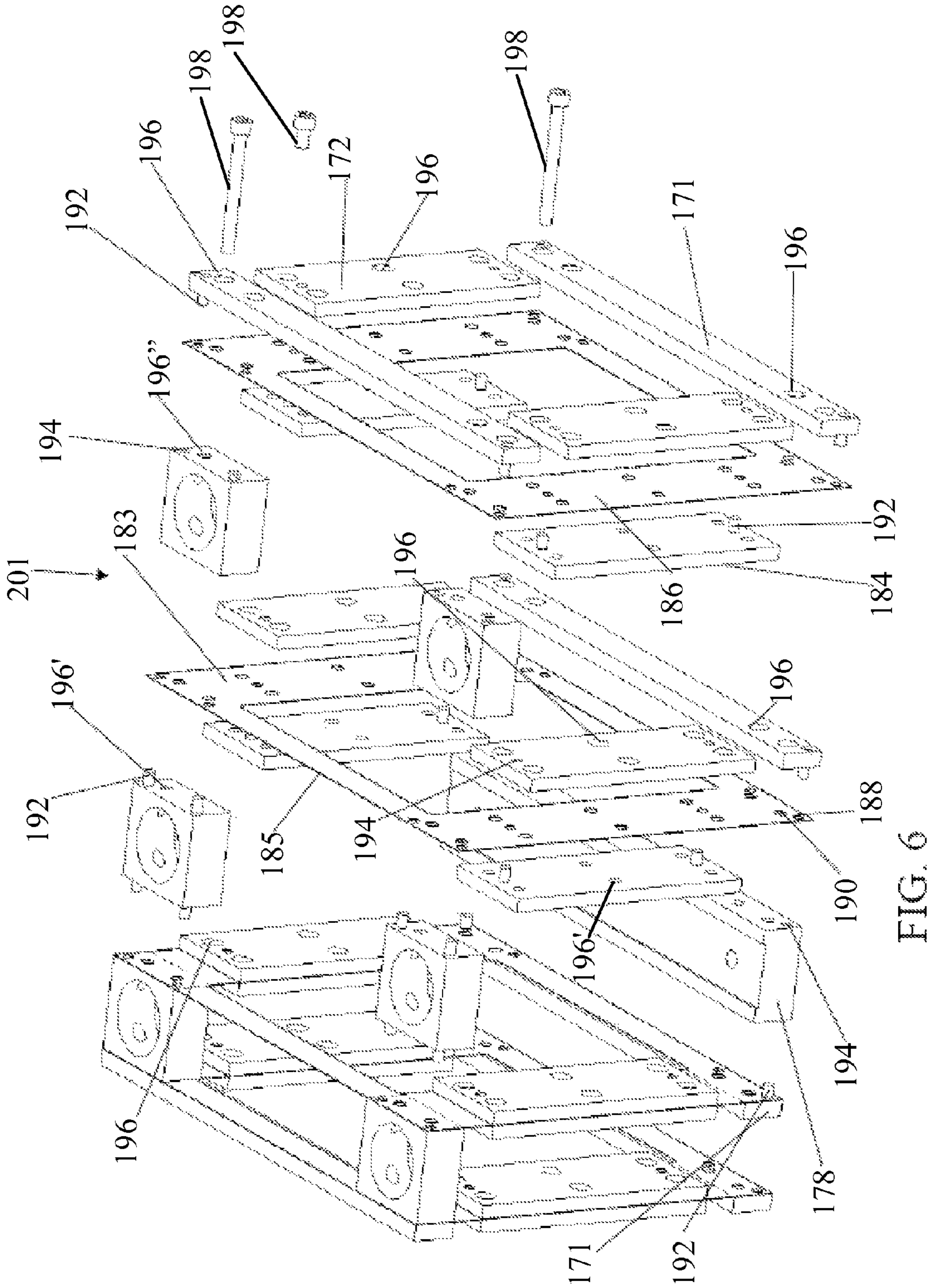
FIG. 6 is an exploded perspective view of a preferred embodiment of a flexure mount for producing pure translational motion.
Figure 7:
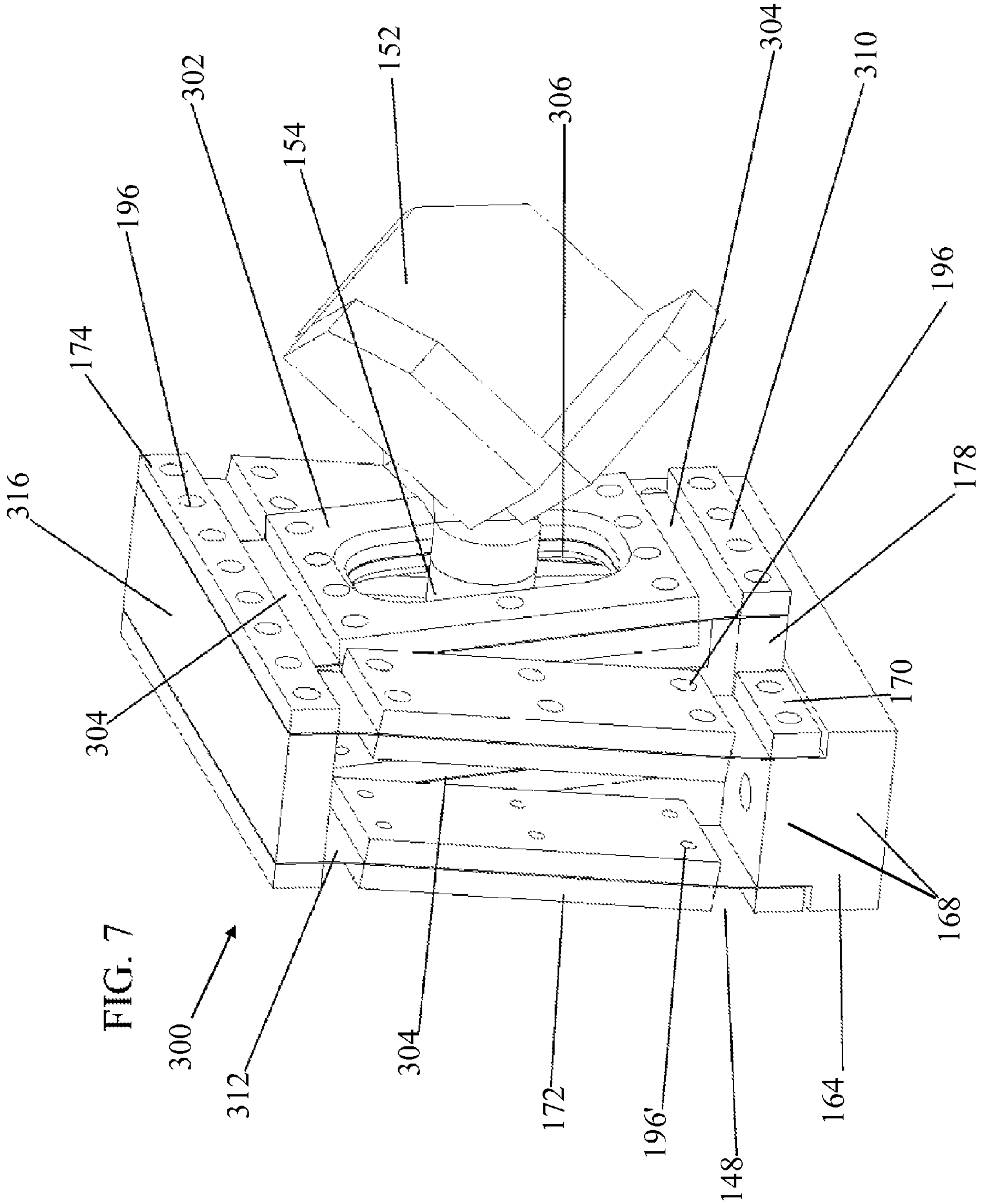
FIG. 7 is a perspective view of a low profile flexure mount for producing pure translational motion.

Alignment and stability of the frame 200 are very important, as is ease of assembly from parts that may be formed with fewer machining steps. To the extent that the total number of parts of frame 200 may be reduced and that fabrication of these parts utilizing more mass production techniques is possible, significant economical savings are achieved. Frame 200 may be assembled using alignment pins 192 in cooperation with alignment pin holes 188 and alignment pin receptacles 196. Assembly is completed with fasteners 198 which cooperate with fastener receptacles 196 and extend through fastener holes 190 in spring 182. Alignment pins 192, pin holes 188, pin receptacles 194, fasteners 198, fastener receptacles 196, fastener holes 190 and fastener tap holes 196' are also used in attaching frame 200 to base 160 via frame connection flange 168. These alignment and assembly elements may be utilized in each embodiment of the present invention and are best illustrated in FIG. 6. Such an arrangement of parts can enable looser tolerances of mass production to still result in a precision instrument.

Figure 8:
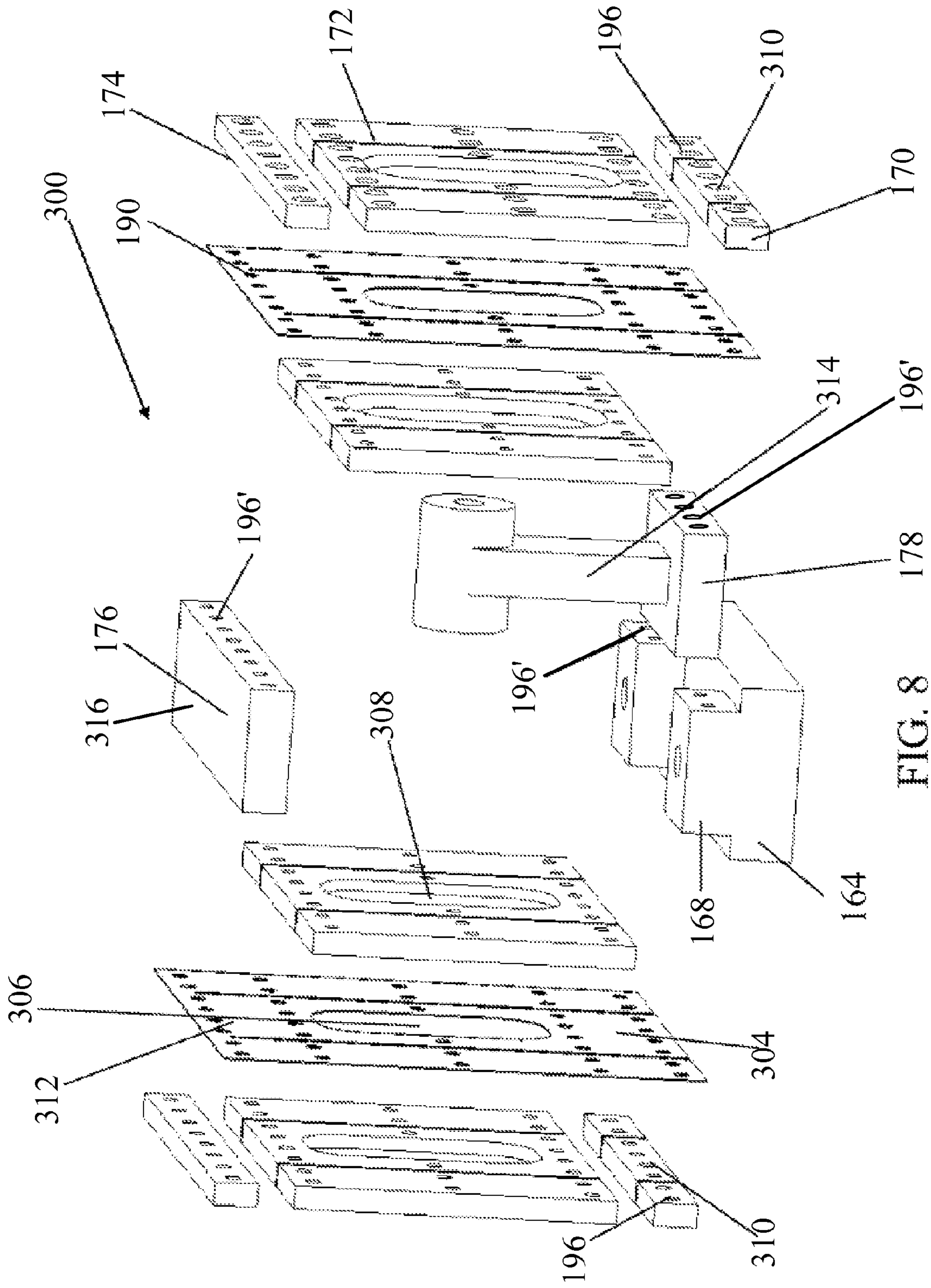
FIG. 8 is an exploded perspective view of a low profile flexure mount for producing pure translational motion.
Figure 9:
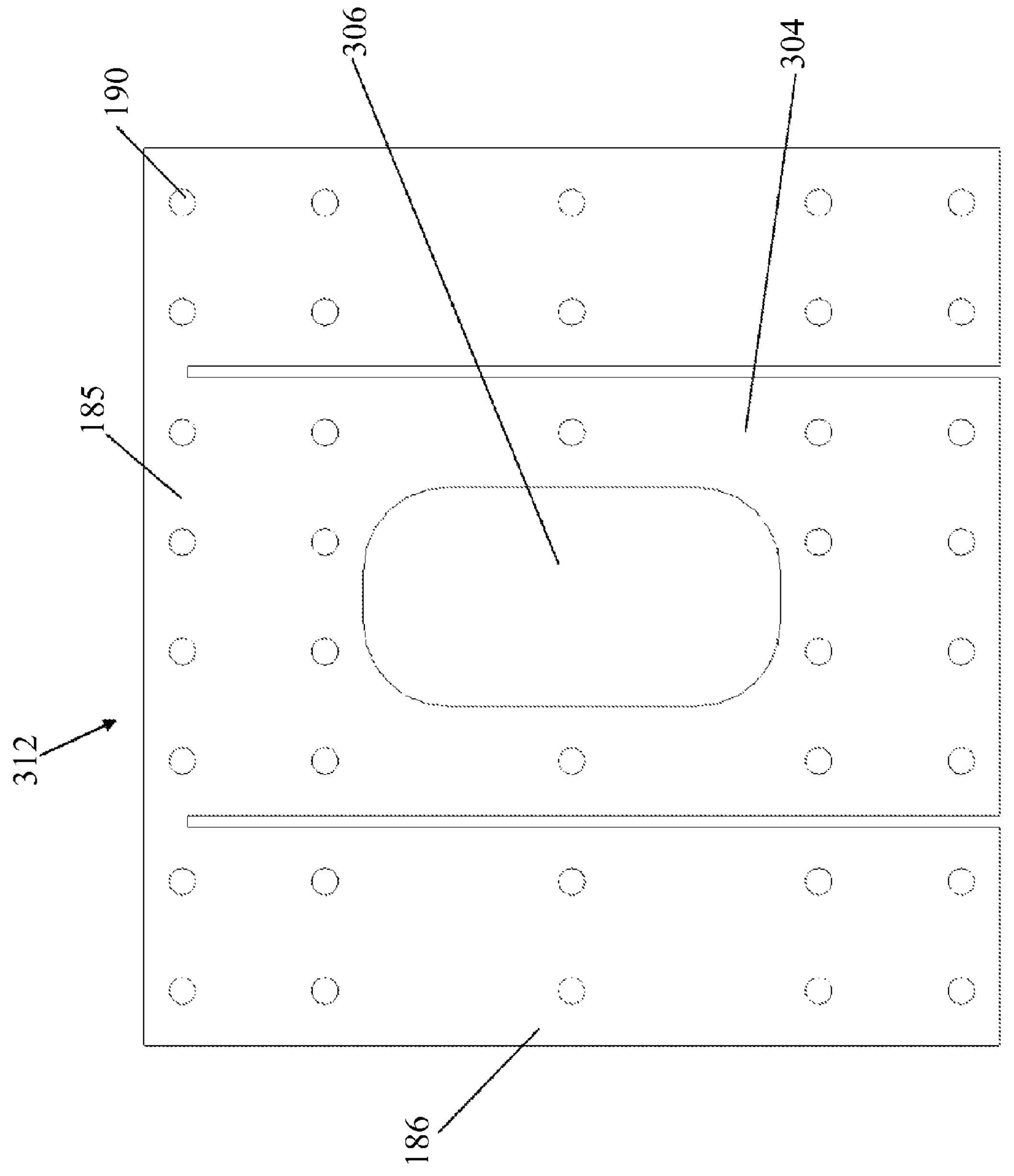
FIG. 9 is a side view of a monolithic spring for use in a low profile flexure mount.
Figure 10:
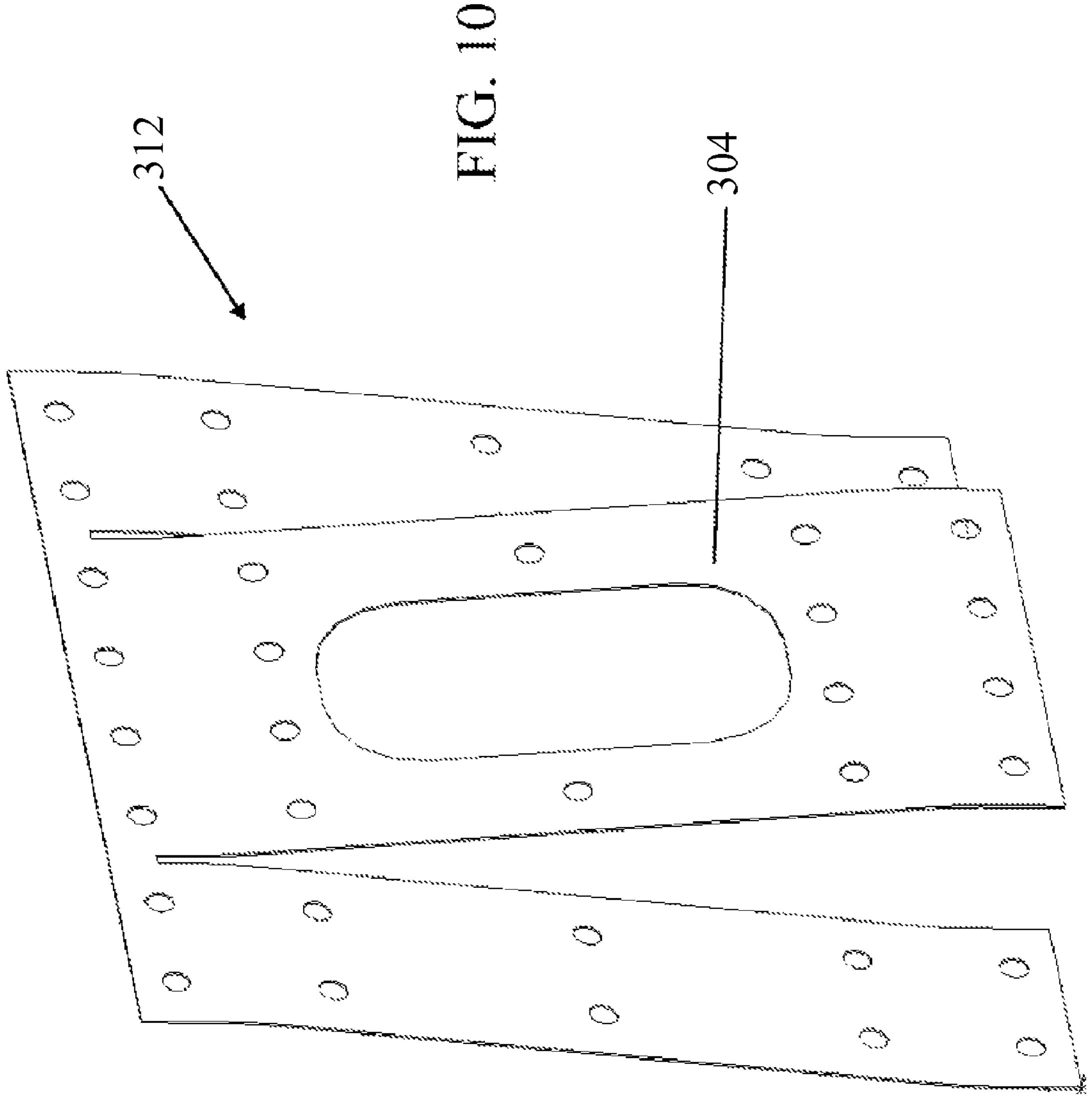
FIG. 10 is a perspective view of a stressed monolithic spring for use in a low profile flexure mount.

As seen in FIG. 8, it is possible to achieve many aspects of the present invention without the alignment pin structures of FIG. 6; the fastener structures are solely relied upon. Alignment assembly rods (not shown) may be used during assembly of a frame without alignment pins. One or more assembly rods are inserted through all structures that will be fastened together while a fastener 198 in attached through a still available set of structures. Once two or three fasteners are in place, alignment rods are not as necessary.

Figure 4:
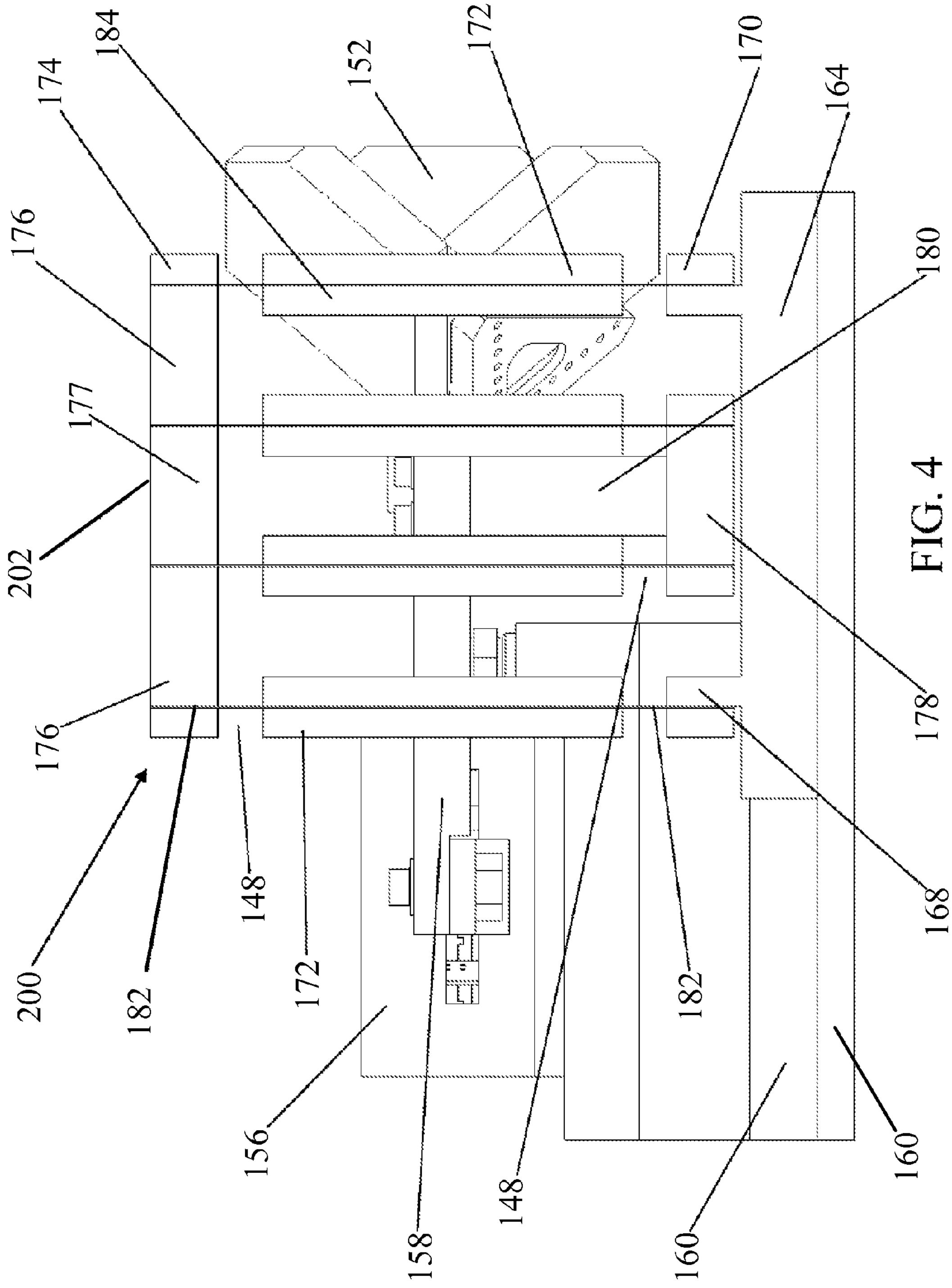
FIG. 4 is a side view of a flexure mount for producing pure translational motion.
Figure 5:
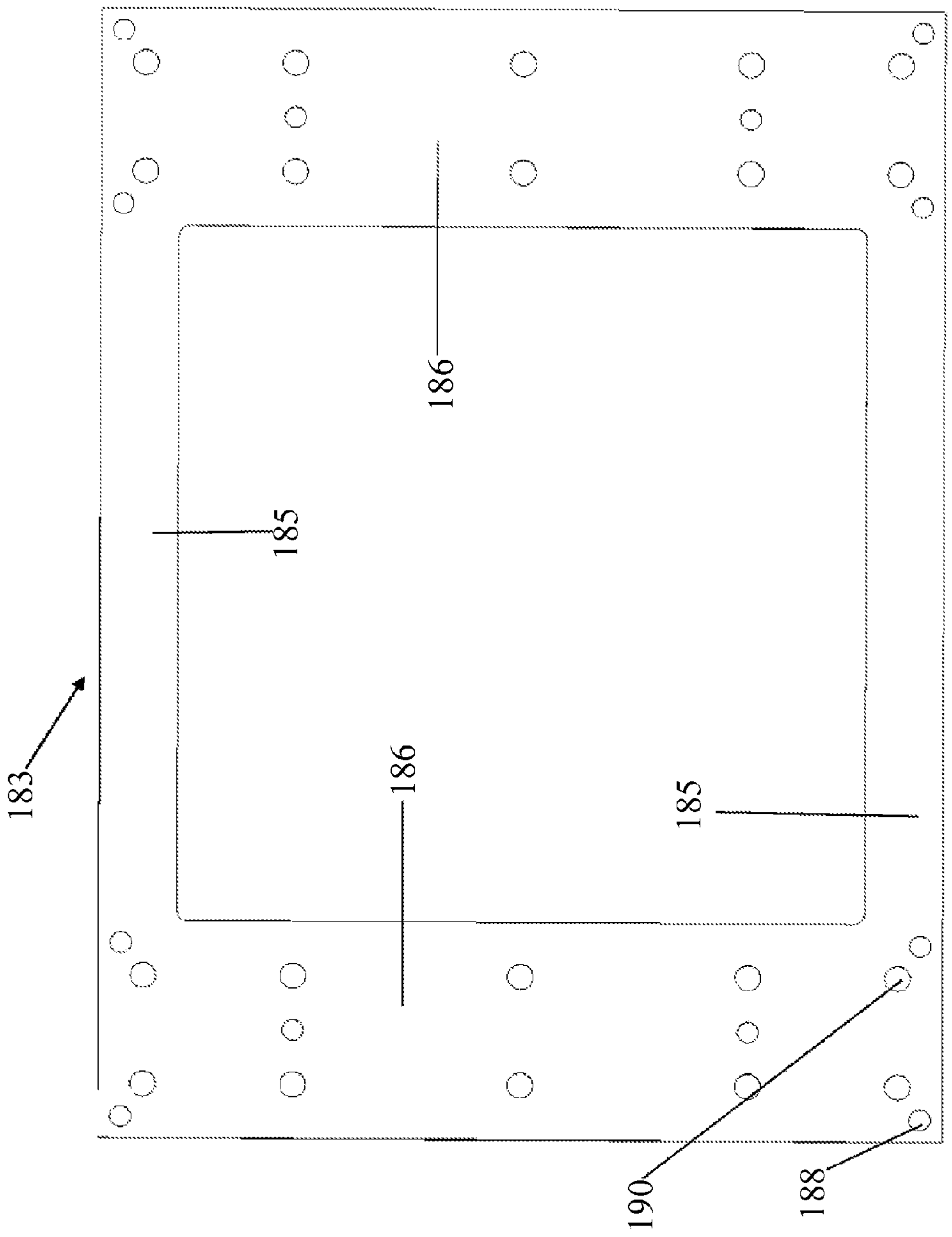
FIG. 5 is a side view of a monolithing spring used in a flexure mount of a preferred embodiment of the present invention.

Frame 200 is generally in the form of a parallelepiped with angles on two faces of the parallelepiped variable, i.e. the face shown in FIG. 4 and its opposing face, while angles on the four remaining faces are invariant, e.g. 90°. This arrangement is enabled primarily through the placement of springs 182 which allow relative displacement of a top face 202 of frame 200 relative to the base 160. Top face 202 of frame 200 is the square defined by top frame portions 176, 177 and transverse frame members 174. The springs 182 may have their central portions clad in stiffening frame members 172, 184. The stiffening frame members 172, 184 may have their alignment optimized using pin holes 188, pins 192 and pin receptacles 194 and secured using fasteners 198, fastener holes 190, fastener receptacles 196 and fastener tap holes 196'. Stiffening frame member 172 receives the head of fastener 198 and stiffening frame member 184 comprises the tap holes for receiving the fastener 198.

In each embodiment described herein, spring stiffening members are optional. The entirety of the spring may be used as a single element instead of dividing it into two smaller elements by way of stiffeners.

Transverse frame members 174 and top frame end portions 176 are similarly aligned adjacent one end of spring 182 using pin holes 188, pins 192 and pin receptacles 194 and secured using fasteners 198, fastener holes 190, fastener receptacles 196 and fastener through bores 196". Fastener through bores 196" are provided in top frame end portion 176, such that fastener 198 passes through top frame end portion 176 and is tightened to tap hole 196' in top frame central portion 177. A bottom end of spring 182 is secured to frame connection flange 168 or carriage member 178 via connection member 170. Fasteners 198 may be of varying length, including a sufficient length to connect transverse frame members 174 to multiple top frame portions 176 and 177 while passing through more than one spring 182. No mechanical connection exists between the carriage member 178 and the bottom frame 164 except through the other elements of frame 200.

Figure 11:
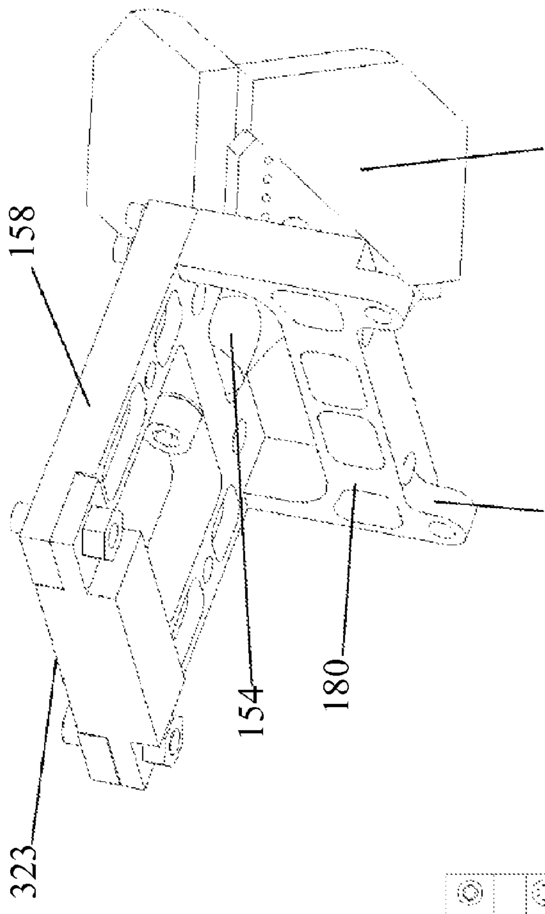
FIG. 11 is a perspective view of translation transmission structure used in a flexure mount for producing pure translational motion.
Figure 12:
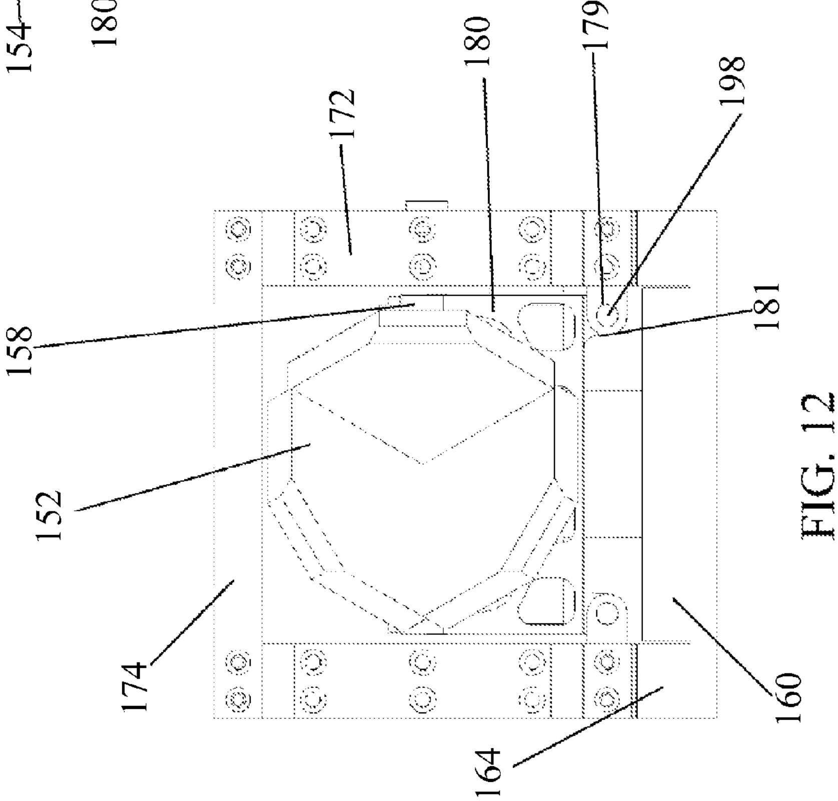
FIG. 12 is an end view of a flexure mount for producing pure translational motion.

Thus, frame 200 is attached to base 160 upon which resides voice coil actuator 156. As seen in FIGS. 11 and 12, voice coil actuator 156 imparts a force through the driven voice coil 323 upon translation bracket 158, translation arm 154 and retroreflector 152. Each carriage member 178 is connected to translation bracket 158 and translation arm 154 by bridge 180. Each carriage member 178 is attached by carriage attachment point 179 to bridge attachment point 181 by a fastener 198.

In accordance with known principles of flexure design, the compound spring of frame 200 will offset any reduction in height of frame 200, i.e. the distance between top face 202 and base 160, by an equal and opposite ‘lifting’ of carriage member 178 and, thus, translation arm 154. Thus, translation arm 154 and retroreflector 152 can only move parallel to base 160 and the change in height relative to base 160 is zero. Put another way, curvilinear motion between retroreflector 152 and 160 is eliminated as completely as possible.

Obviously, the portions of spring 182 that are clamped between frame elements, e.g. 178/184 or 174/176, do not act as springs. Only the exposed portions of spring 182 function as springs, e.g. between stiffening frame members 172, 184 and the transverse frame member 174 or connection member 170. This exposed portion of spring 182 can be referred to as the flexure gap 148. In the arrangement presented herein, the spring constant for each spring element must be as close to equal as possible. Any inequality or deviation from a desired constant value could adversely affect the precise planar relationship desired between top frame face 202 and base 160 and/or the equal 'lifting' of retroreflector 152. In the arrangements of FIGS. 3, 4 and 6, there are sixteen spring elements and thirty-two flexure gaps, i.e. one on each side of each spring element. Control over the size of the thirty-two flexure gaps 148 is a key tolerance issue. Deviations in the size of the flexure gap 148 can cause a reduction in the purity of the translational motion enabled by the frame 200. Connection members 170 cause particularly difficult tolerance control issues because eight such members are used in FIG. 3 each influencing the size of two flexure gaps 148.

FIG. 6 is an exploded view of a preferred embodiment of frame 200. Frame 201 utilizes monolithic springs 183 having at least one spring cross piece 185 and two vertical pieces 186. Cross pieces 185 may be utilized across the top and bottom of spring 183. The eight independent connection members 170 are replaced by four cross connection members 171. Besides the general reduction in necessary parts, the monolithic springs 183 and cross connection members 171 greatly reduce the tolerance concerns of the connection members. Combined with the alignment pin arrangements, among other factors, tight control of the size of the flexure gaps 148 is achieved in an economical manner.

A single carriage member 178 is also enabled in the preferred embodiment, further aiding in the size control of flexure gaps 148 as well as the all-around reduced number of parts. In addition, bridge 180 may be replaced by the simpler post 314, as shown in FIG. 8, connecting the carriage member 178 to translation arm 154 and/or translation bracket 158.

An alternative embodiment of the present invention is disclosed in FIGS. 7-10. Low profile frame 300 brings carriage member and the associated spring portions and stiffener elements to an interior portion of the frame and permits significant reduction in the overall size of the assembly 151. Low profile frame 300 is enabled through the use of compound monolithic spring 312 having a spring central piece 304 with a window 306. Central piece stiffening member 302 is also provided with a window 308 and performs the same function as stiffening member 172. A single carriage member 178 is centered in the frame 300 and attached to the lower end of spring central piece by connection member 310.

The compound monolithic spring 312 eliminates the need for two monolithic springs 183. The typical result of part reduction and elimination of degrees of freedom to tolerance factors is achieved by this elimination. In addition, each set of two spring elements is merged into a single spring element, i.e. along the top of spring central piece 304. This single spring element is exactly twice the width of the single spring elements along the top of each spring vertical piece 186 of spring 183. Thus, the spring constants are the same for the monolithic spring 183 and the compound monolithic spring 312.

Windows 306 and 308 may be sized to accommodate only translation arm 154. Alternatively, windows 306 and 308 may be sized to accommodate some or all of translation bracket 154 and/or some or all of retroreflector 152 to further reduce the profile offered by frame 300. In addition, the low profile frame 300 requires only twelve springs and twenty four flexure gaps 148. Some of these flexure gaps share a single element defining one side thereof, i.e. two transverse frame member 174 and top frame member 316 define one side of half of the flexure gaps 148.

Bridge 180 may be replaced by the simpler post 314 connecting the carriage member 178 to translation arm 154 and/or translation bracket 158.

The alignment pin 192 arrangement may also be used in conjunction with some or all assembly of the low profile frame 300. Though the drastic reduction in the number of parts may completely obviate the need for using alignment pins 192.

Figure 14:
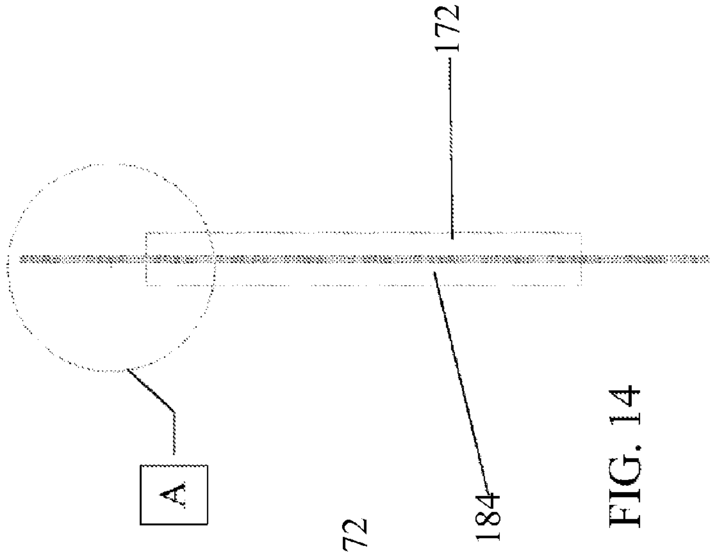
FIG. 14 is a side view of a preferred embodiment of a spring arrangement.
Figure 13:
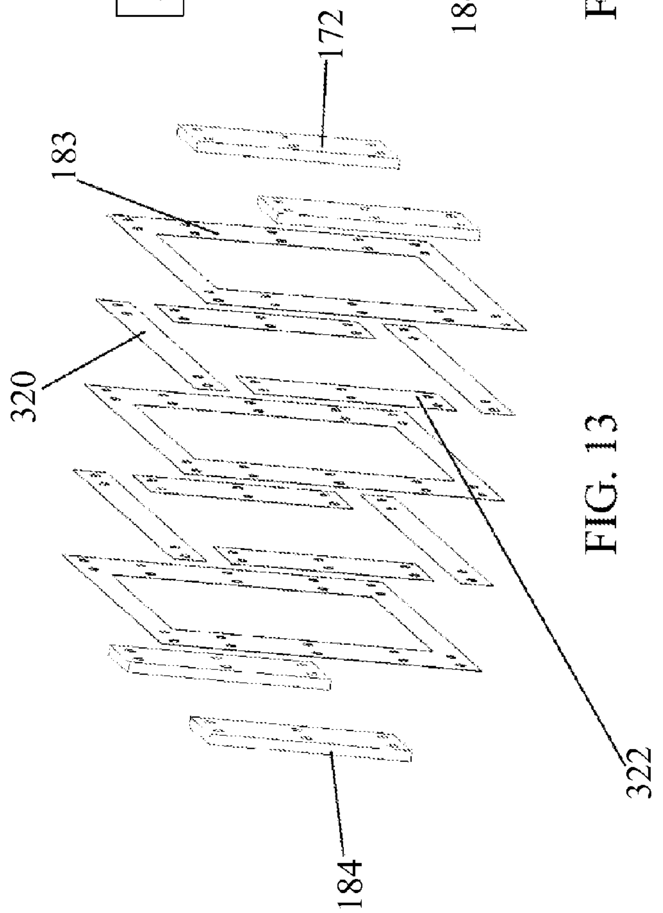
FIG. 13 is a perspective exploded view of a preferred embodiment of a spring arrangement.
Figure 14A:
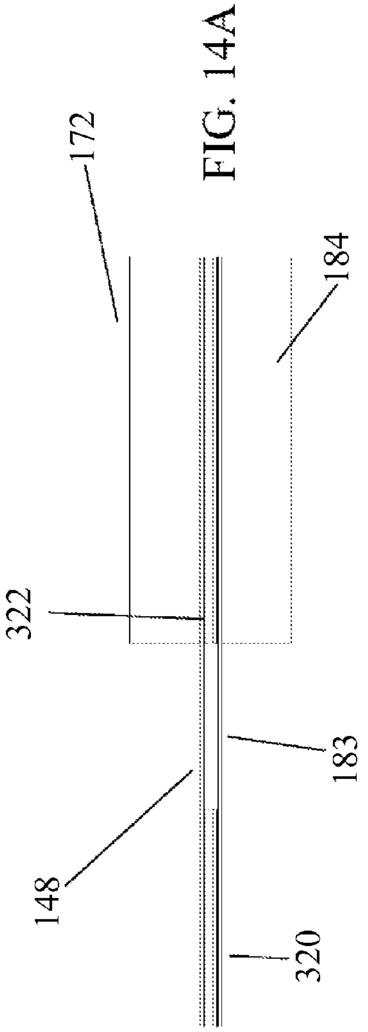
FIG. 14A is a detail of FIG. 14.

FIG. 13 is an exploded view of an alternative embodiment utilizing multiple monolithic springs 183. Compound monolithic spring 312 could also be utilized in this manner. A plurality of monolithic springs 183 are separated by spacers 320, 322 spanning the non-flexing areas of the monolithic springs 183. Stiffening frame members 172, 184, 302 and other elements of the frame, e.g. transverse frame member 174 and top frame member 316, retain the spacers 320, 322 in place in the same way that the monolithic springs 283, 312 are typically held in place. Once assembled in the full frame, as best seen in detail FIG. 14A, flexure gap 148 is preferably coextensive with the areas not occupied by spacers 320, 322.

Figure 15:
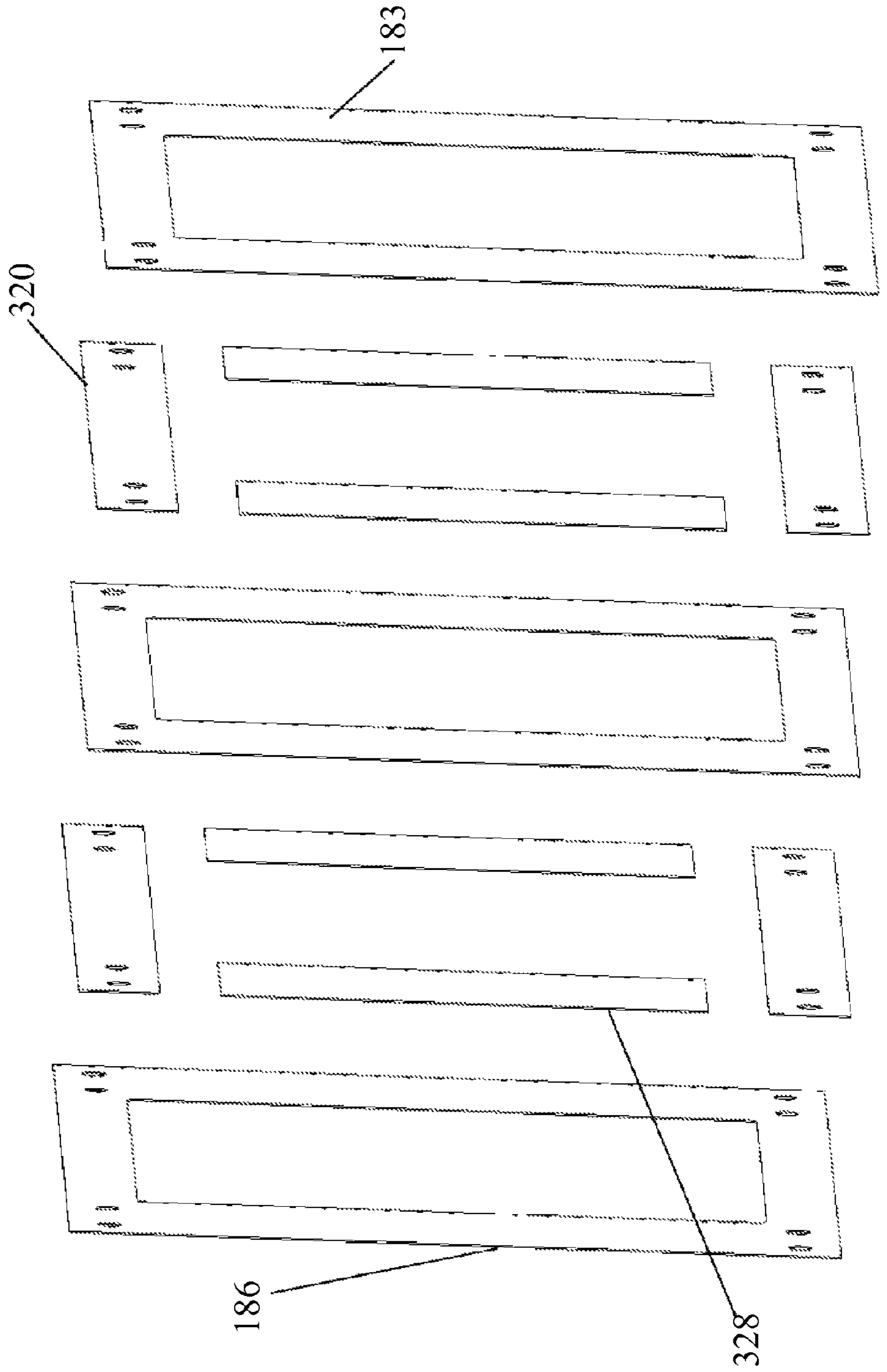
FIG. 15 is a perspective exploded view of a preferred embodiment of a spring arrangement.

In a further alternative embodiment, as illustrated in FIG. 15, spacers 320 remains but spacer 322 is replaced with a viscoelastic damping material 328. As shown, there are three monolithic springs 183. No stiffening members 172, 184 are utilized in this alternative embodiment, as discussed previously. Thus, the entire vertical piece 186 of monolithic springs 183 act as flexural elements. When they are present, viscoelastic damping material 328, which may be affixed adhesively, or by casting in place a viscoelastic compound material 328, act to damp the motion of the flexural springs through shear or other damping, with either an unimportant or compensated-in-design effect on the stiffness characteristics of the flexural springs.

When material 328 is absent, the resulting air space causes the monolithic springs to flex semi-independently. These flexings will be substantially identical if the assembly, facilitated by proper tolerances of the parts and self-fixturing enabled by the monolithic springs, is done accurately. When the flexings are identical, the stiffness of the individual springs add, and the accurate translational properties of the variable path length assembly 151 are preserved. By this method, it is possible to choose thicknesses of multiple monolithic springs 183 replicating the stiffness properties of designs with a single spring but with much reduced stress in the individual springs, and with increased stiffness of the assembly in directions orthogonal to the desired translation direction.

When viscoelastic damping material 328 is provided, an advantage in control system stability is obtained, permitting more accurate linear trajectory of the mount and lower noise operation. Finally, it will be appreciated that a compound non-stiffened spring, with a viscoelastic damping embodiment option exists for the side-by-side flexure mount embodiment shown in FIG. 7 by similar compounding of springs 312 therein, and other elements, with or without the inclusion of clamping and viscoelastic damping materials, in a manner similar to the method shown in FIGS. 13-15.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may achieve numerous modifications thereto and changes may be made without departing from the scope and spirit of the invention in its aspects.

What is claimed is:

1. A precision instrument flexure mount comprising:

a. a base;

b. an actuator having a fixed relationship to the base;

c. a frame mounted on the base comprising:

i. two base monolithic springs and two carriage monolithic springs, each spring having a cross piece and two vertical pieces with bottom ends;

ii. a plurality of transverse members, each transverse member is fastened to a top frame portion with at least a portion of one spring cross piece held therebetween; and iii. the bottom end of each vertical piece of the carriage springs fastened between a connection member and a carriage member;

iv. the bottom end of each vertical piece of the base springs fastened between a connection member and the base; and d. a translation arm attached adjacent a first end to the actuator and adjacent a second end to a precision instrument element, a central portion of the translation arm extending through the frame and attached to the carriage member, the actuator imparting a force on the arm, whereby translation of the arm through the frame is constrained to one orthogonal axis.

2. The flexure mount of claim 1, further comprising:

a. stiffening members disposed over a central portion of the spring vertical pieces, dividing the spring vertical pieces into two spring elements.

3. The flexure mount of claim 1, further comprising an assembly alignment system comprising:

a. a plurality of pin holes in one or more monolithic springs;

b. a plurality of pin receptacles in:

i. each one of either the transverse member or top frame portion;

ii. each one of either the carriage connection member or the carriage member; and iii. each one of either the base connection member or the base;

c. a plurality of alignment pins on:

i. the other of either the transverse member or top frame portion;

ii. the other of either the carriage connection member or the carriage member; and iii. the other of either the base connection member or the base; d. each alignment pin in registration with one pin hole and one pin receptacle, enabling precision assembly of the frame.

4. The flexure mount of claim 1, further comprising first and second stiffening members disposed over first and second sides of a central portion of the spring vertical pieces, respectively, dividing the spring vertical pieces into two spring elements and an assembly alignment system comprising:

a. a plurality of pin holes in one or more monolithic springs;

b. a plurality of pin receptacles in one of either the first stiffening member or second stiffening member;

c. a plurality of alignment pins in the other of the first stiffening member or second stiffening member, each alignment pin in registration with one pin hole and one pin receptacle, enabling precision assembly of the stiffening members.

* * * * *